United States Patent
So

(10) Patent No.: US 8,295,201 B2
(45) Date of Patent: Oct. 23, 2012

(54) SYSTEM AND METHOD FOR PROVIDING LOWER-LAYER PATH VALIDATION FOR HIGHER-LAYER AUTONOMOUS SYSTEMS

(75) Inventor: Ning So, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 188 days.

(21) Appl. No.: 12/502,487

(22) Filed: Jul. 14, 2009

(65) Prior Publication Data
US 2011/0013517 A1   Jan. 20, 2011

(51) Int. Cl.
*H04L 12/28* (2006.01)
(52) U.S. Cl. ........................ 370/254
(58) Field of Classification Search .......... 370/254–256, 370/351, 389, 395.5, 395.52, 400, 401
See application file for complete search history.

(56) References Cited

U.S. PATENT DOCUMENTS

| | | | | |
|---|---|---|---|---|
| 6,882,643 B1 * | 4/2005 | Mauger et al. | ................ | 370/389 |
| 7,120,118 B2 * | 10/2006 | Rajagopal et al. | ............ | 370/237 |
| 7,486,679 B2 * | 2/2009 | Vigoureux et al. | ...... | 370/395.21 |
| 7,590,149 B1 * | 9/2009 | Bharali et al. | ................ | 370/468 |
| 7,599,349 B2 * | 10/2009 | Vasseur et al. | ................ | 370/351 |
| 7,653,308 B2 * | 1/2010 | Miyazaki et al. | ............... | 398/58 |
| 7,697,439 B2 * | 4/2010 | Martini et al. | ................ | 370/238 |
| 7,801,048 B1 * | 9/2010 | Sivabalan et al. | ............. | 370/238 |
| 7,808,972 B2 * | 10/2010 | Zhang | ........................... | 370/351 |
| 2008/0279103 A1 * | 11/2008 | Yong et al. | .................... | 370/235 |
| 2009/0185569 A1 * | 7/2009 | Yong et al. | ............... | 370/395.31 |

OTHER PUBLICATIONS

Farrel, A path Computation Element (PCE) based Architecture, Internet Society, RFC 4655, Aug. 2006, pp. 1-40.*

* cited by examiner

*Primary Examiner* — Dmitry H Levitan

(57) ABSTRACT

An approach is provided for validating lower layer paths for higher layer networks. A request for path cost information is generated relating to a path traversing a first autonomous system and a second autonomous system, wherein each of the autonomous systems utilizes different cost metrics. The path cost information is received associated with reservation of capacity for the path. The path cost information is evaluated. The reservation is selectively accepted based on the evaluation.

10 Claims, 10 Drawing Sheets

SYSTEM AND METHOD FOR PROVIDING LOWER-LAYER PATH VALIDATION FOR HIGHER-LAYER AUTONOMOUS SYSTEMS

BACKGROUND INFORMATION

Telecommunication networks (or autonomous systems) have developed from connection-oriented, circuit-switched (CO-CS) systems, such as the public switched telephone network (PSTN), utilizing constant bit-rate, predefined point-to-point connections to connectionless, packet-switched (CNLS) systems, such as the Internet, utilizing dynamically configured routes characterized by one or more communication channels divided into arbitrary numbers of variable bit-rate channels. With the increase in demand for broadband communications and services, telecommunication service providers are beginning to integrate long-distance, large-capacity optical communication networks with these traditional CO-CS and CNLS systems. Typically, these optical communication networks utilize multiplexing transport techniques, such as time-division multiplexing (TDM), wavelength-division multiplexing (WDM), and the like, for transmitting information over optical fibers. However, an increase in demand for more flexible, resilient transport is driving optical communication networks toward high-speed, large-capacity packet-switching transmission techniques that enable switching and transport functions to occur in completely optical states via one or more packets at one or more layers of a network. This technological innovation carries with it a new burden to provision reliable service over these networks, i.e., service that is capable of withstanding link and node failure while also maintaining high transmission capacity. As a result, inter-layer network and traffic engineering plays an important role in providing improved network reliability and performance. However, given that a multitude of networks operate under varying infrastructures and protocols, reserving and assessing the validity of inter-layer paths is becoming increasingly more challenging.

Therefore, there is a need for an approach that provides for effective and efficient validation of lower-layer paths for higher-layer autonomous systems.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for providing lower-layer path validation for higher-layer autonomous systems are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to inter-layer network and traffic engineering between packet optical switching and multi-protocol label switching (MPLS) domains and associated traffic flows (or paths), it is contemplated that various exemplary embodiments are applicable to other equivalent systems and traffic flows.

Figure 1:
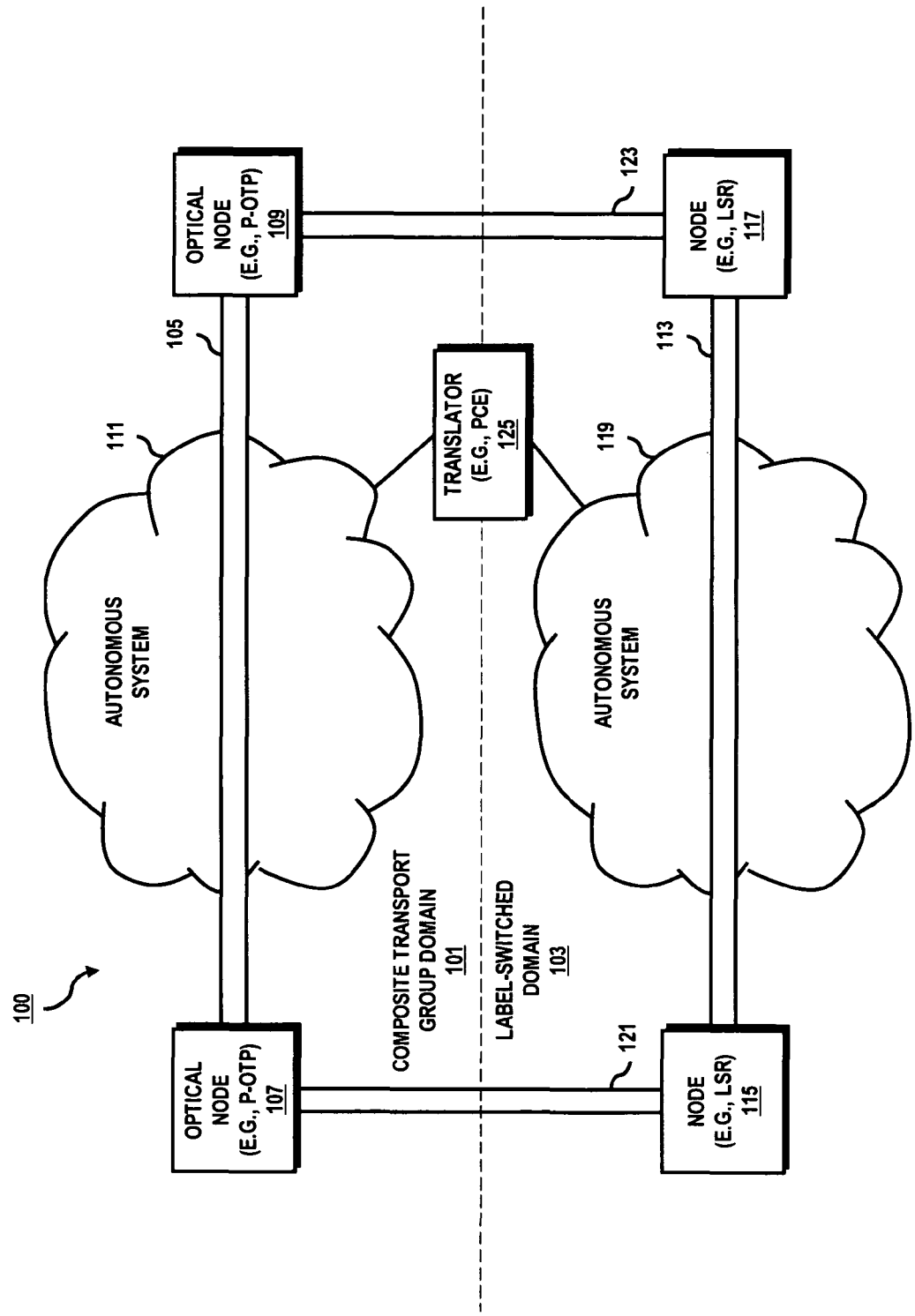
FIG. 1 is a diagram of a system configured to facilitate lower-layer path validation for higher-layer autonomous systems, according to an exemplary embodiment.

FIG. 1 is a diagram of a system configured to facilitate lower-layer path validation for higher-layer autonomous systems, according to an exemplary embodiment. For the purposes of illustration, a system 100 for validating lower-layer paths for higher-layer networks (e.g., autonomous systems) is described with respect to inter-layer interworking between composite transport groups (CTG) and multi-protocol label switching (MPLS) paths of a packet-switched optical infrastructure. As shown, system 100 includes CTG domain 101 and label-switched domain 103, such as an MPLS domain. In one particular implementation, one or more CTG paths 105 may be established in CTG domain 101 between one or more optical nodes (e.g., optical nodes 107 and 109) of autonomous system 111. Further, label-switched domain 103 may include one or more MPLS paths 113 established (or terminated) at one or more boundary (or edge) nodes, such as nodes 115 and 117 of autonomous system 119.

By way of example, autonomous systems 111 and 119 serve as respective lower and higher layers of the packet-switched optical infrastructure of system 100 and, thereby, may interface via one or more network-to-network interfaces (NNI), such as NNIs 121 and 123. It is noted that, in an alternative embodiment, autonomous systems 111 and 119 may be sub-networks (or layers) of a single autonomous system. As such, one or more inter-layer paths may traverse NNIs 121 and 123 and, accordingly, may be interworked between CTG domain 101 and label-switched domain 103 so as to facilitate lower-layer path validation for higher-layer autonomous systems. While specific reference will be made hereto, it is contemplated that system 100 may embody many forms and include multiple and/or alternative components and facilities.

It is recognized that multi-protocol label switching (MPLS) traffic engineering (TE) has been developed to provide network administrators with the ability to control and manipulate the flow of traffic through a network. MPLS-TE utilizes label switching techniques to construct label switched paths (LSP), label distribution protocol (LDP) flows, and fast re-route (FRR) tunnels on one or more links interconnecting nodes of one or more networks (or autonomous systems).

Routing protocols, such as open-shortest path first (OSPF) and intermediate system to intermediate system (IS-IS), are utilized to determine MPLS traffic flow routes through the network, as well as govern the distribution of routing information between nodes of the network(s). OSPF and IS-IS utilize various attributes characterizing the links, such as bandwidth, to determine, reserve, and validate MPLS traffic flow routes and, thereby, require nodes of the network to report (or announce) these characteristics concerning any directly connected links. It is noted that these attributes (or characteristics) may also be referred to as TE parameters (or metrics). Accordingly, as the topology of autonomous systems become more complex, the announcement and utilization of these metrics is becoming increasingly onerous and inefficient, such as in cases of traffic flows (or paths) traversing multiple layers and/or disparate domains.

Composite transport groups (CTG), i.e., logical bundling of physical and/or logical links that are viewed by high layer routing and switching protocols as single logical interfaces, can lessen the aforementioned burdens by simplifying bandwidth management, improving bandwidth utilization, and delivering cost-effective protection schemes. Further, CTGs improve transport scalability by reducing the amount of information announced and, thereby, handled by signaling and/or routing protocols, such as OSPF, IS-IS, etc., for the establishment of one or more traffic paths. It is noted that this reduction is accomplished by performing information aggregation (or abstraction) based on and using information characteristic to particular CTGs, i.e., the attributes defining the characteristics of the component connections grouped into the particular CTGs. As such, CTGs are configured to resolve the provisioning of traffic paths onto one or more component connections forming the CTGs by interworking traffic paths onto the CTGs.

Even still, supporting end-to-end (or inter-layer) TE across multiple autonomous system layers and domains can promote additional efficiencies, such as the utilization and optimization of otherwise unused capacity available on network-to-network interfaces (NNI) extending between autonomous system layers and/or domains. It is noted that a domain is a collection of networking elements (e.g., nodes, routers, switches, etc.) within a common sphere of address management and/or path computation responsibilities, such as interior gateway protocol (IGP) areas, autonomous systems, and multiple autonomous systems within (or among) telecommunication service providers. In this manner, a server-layer network of one switching capability may support multiple autonomous systems of another (more granular) switching capability. For example, time-division multiplexing (TDM) autonomous systems may provide connectivity for client-layer networks such as internet protocol (IP), MPLS, etc. As such, lower layer MPLS-TE traffic flows may be used to carry upper-layer MPLS-TE traffic flows and, thus, help promote the optimization of resource utilization.

Conventionally, however, inter-layer MPLS-TE signaling and/or path reservation has been limited to merely addressing theoretical bandwidth considerations. This is at the expense of other considerations, such as latency (or delay) incurred in the transport of information across an autonomous system. Even though theoretical peak bandwidth of an MPLS-TE traffic flow may be fixed according to one or more technological constraints, the actual, realized bandwidth typically varies over time and, thereby, is largely affected by latency considerations.

Therefore, the approach of system 100, according to certain embodiments, stems from the recognition that enabling lower-layer path validation for higher-layer autonomous systems capable of taking into consideration various networking parameters, such as administrative cost, bandwidth, latency, path cost, ranking, etc., provides efficient and effective techniques to optimize resource utilization across all autonomous system layers, rather than optimizing layer resources independently from one another. Furthermore, interworking traffic onto CTG paths in support of inter-layer MPLS-TE logically reduces the complexity of lower-layer topologies, as well as reduces the amount of TE parameters that must be announced and considered. In turn, MPLS-TE is enhanced and routing scalability is improved. This is because CTGs manage sets of "component connections" (i.e., logical channels) as "composite connections," as well as manage associations between client node instances and composite connections, which enable CTGs to dynamically distribute network traffic over the component connections transparently from the nodes transmitting and receiving a flow of traffic. In other words, CTGs, among other features, enable individual pathways to carry network traffic from multiple client nodes, maintain independent pathway transport availabilities and capacities, and provide for disparate transport rates, all the while enabling these individual pathways to provide pathway protection for one another. Furthermore, provisioning CTGs in support of inter-layer MPLS-TE only requires the CTGs to be announced as single TE pathways that are characterized by aggregate TE parameters, instead of having to individually report a multitude of component connections and their mass of associated TE parameters. Namely, when an LSP is established, only the aggregate CTG pathway need be identified, such that provisioning the LSP over the CTG becomes a local matter transparently resolved by the CTG, as opposed to the nodes transmitting and receiving the flow of traffic.

According to one embodiment, system 100 supports lower-layer path validation for higher-layer autonomous systems by exchanging, evaluating, and comparing various forms of administrative cost information (e.g., path cost information, path rankings, and/or path latency) for selectively accepting or rejecting resource reservations associated with reserving capacity for inter-layer paths which may traverse multiple autonomous systems and/or domains, such as autonomous system 111 and 119, CTG domain 101, and label-switching domain 103. It is noted that a translator 125 may be utilized to translate, convert, or otherwise normalize administrative cost information between autonomous system layers and among domains in order to support comparisons. In certain embodiments, translator 125 may be a path computation element (PCE) as defined by Farrel, et al., "A Path Computation Element (PCE)-Based Architecture," Request for Comment (RFC) 4655, Internet Engineering Task Force (IETF), August 2006, which is incorporated, herein, by reference, in its entirety. As such, translator 125 may utilize information stored to one or more management information base (MIB) tables (not shown) providing translator 125 with various networking information, such as one or more communication protocols, routing and signaling extensions, metric standards, PCE monitoring information, and the like, corresponding to the administrative cost information, associated with the paths of system 100. In this way, translator 125 may quantify disparate administrative cost metrics according to one common scheme, such as a scheme utilizing administrative costs corresponding to label-switched domain 103 parameters.

In exemplary embodiments, CTG paths (or composite connections) 105 of system 100 may be configured to support connection-oriented flows, e.g., network traffic embodying, for example, information packetized into one or more packets. Connectionless communications may also be encapsulated within connection-oriented connections. CTG paths 105 may be established for transport of network traffic from optical node 107 to optical node 109, and may include one or more sets (or bundles) of physical and/or logical channels (or component connections). It is also contemplated that the physical and/or logical channels may be grouped in multiple CTG paths 105. As such, CTG paths 105 can be utilized as lower-layer paths in support of higher-layer autonomous systems (e.g., autonomous system 119) including one or more higher-layer paths, e.g., MPLS paths 113.

It is noted that the characteristics of the component links (i.e., CTG internal parameters), according to particular embodiments, may correspond to component link administrative costs (or TE metrics), physical bandwidths of the component links, connections (or pathways) on the component links consuming bandwidth, connection placement priorities, connection holding priorities, connection latency parameters, and/or connection over-subscription factors. In turn, the aggregate characteristics (i.e., CTG external parameters) of the CTG may correspond to a CTG administrative cost utilized in shortest path computations, a CTG available bandwidth for supporting one or more LSPs on the CTG, a CTG latency, and/or a maximum LSP bandwidth capable of being provisioned on the CTG. In exemplary embodiments, one or more of these aggregate characteristics, such as the CTG available bandwidth, CTG latency, and/or the maximum LSP bandwidth may be determined and announced per priority (e.g., class of service), and accordingly may be utilized to validate lower layer paths for higher layer autonomous systems.

As seen in FIG. 1, system 100 includes autonomous systems 111 and 119, which at least include nodes 107, 109, 115, and 117, respectively. In exemplary embodiments, system 100 is a connection-oriented transport environment having one or more optical links established therein, wherein individual optical links embody optical fibers configured to carry data between nodes, e.g., between nodes 107, 109, 115, and 117. It is noted that optical links (or paths) 105, 113, 121 and 123 may be automatically setup and torn down by means of any suitable signaling protocol, e.g., label distribution protocol (LDP), targeted LDP (TLDP), resource reservation protocol for traffic engineering (RSVP-TE), etc. Accordingly, optical links 105, 113, 121 and 123 may carry information over various wavelengths or "channels." Routing protocols may include OSPF, IS-IS, border gateway protocol (BGP), interior gateway protocol (IGP), or any other suitable link-state or optimized link-state routing protocol Autonomous systems 111 and 119 may be any type of wired and/or wireless transport infrastructure (and/or layer thereof), such as a local area network (LAN), metropolitan area network (MAN), wide area network (WAN), etc. At least a portion of autonomous systems 111 and 119 comply with the International Telecommunications Union—Telecommunication (ITU-T) standards recommendation working draft G.800 titled, "Unified Functional Architecture of Transport Networks," which is incorporated herein, by reference, in its entirety. Further, autonomous systems 111 and 119 may be configured to support inter-layer MPLS-TE.

Nodes 115 and 117 may be any suitable networking device, such as a computing device, router, switch, etc., whereas optical nodes 107 and 109 may be any suitable optical transport platform, such as a terminal, multiplexor, reconfigurable add/drop multiplexer, photonic switch, optical cross-connect with optical-electrical-optical conversion, synchronous optical networking cross-connect, signal regenerator, router, switch, or any other suitable optical networking interface, such as a packet optical transport platform.

Accordingly, inter-layer paths may be reserved, validated, and torn down between nodes 107 and 115 via NNI 121 and between nodes 109 and 117 via NNI 123, which represent physical connections along which packets may be transported between disparate layers and/or domains of system 100. Further, intra-layer CTG path(s) 105 may be reserved, validated and torn down between optical nodes 107 and 109 of autonomous system 111, whereas intra-layer path(s) 113 may be reserved validated, and torn down between nodes 115 and 117 of autonomous system 119. As such, a topology of system 100 can be characterized via optical links (or paths) 105, 113, 121, and 123 that further characterize the available transport capacity (e.g., bandwidth capacity) between nodes of autonomous systems 111 and 119. Thus, during optical link configuration, optical links (or paths) 105 may be established as groupings of one or more CTGs for provisioning network traffic among and between nodes 107 and 109. As such, CTGs give nodes 107 and 109 the property of adjacency when viewed by higher layer networking protocols, such as OSPF, IS-IS, etc., of autonomous system 119.

Figure 2:
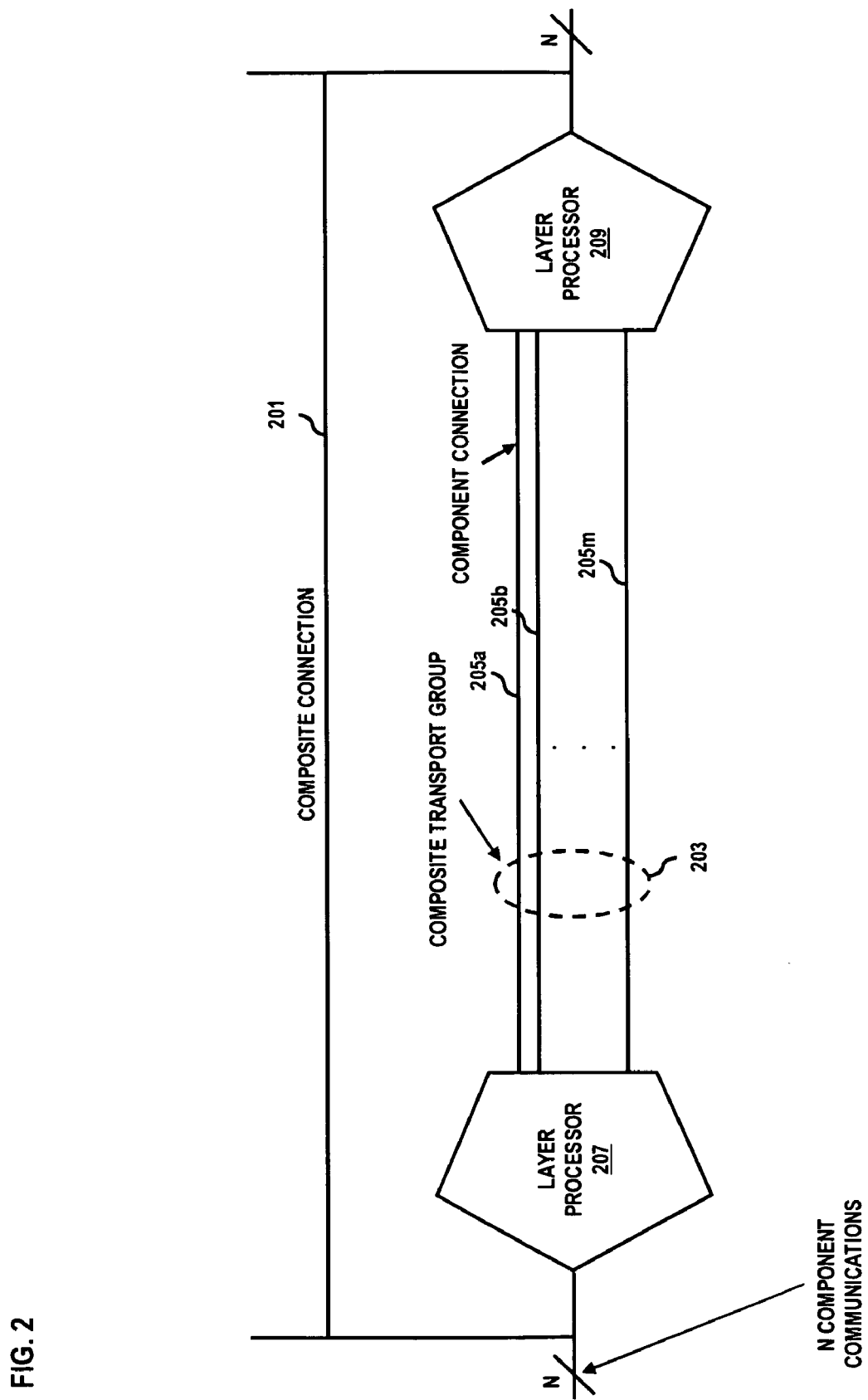
FIG. 2 is a diagram of a composite transport group, according to an exemplary embodiment.

FIG. 2 is a diagram of a composite transport group, according to an exemplary embodiment. As shown, composite connection 201 is made available via CTG 203, which includes one or more parallel component connections (e.g., physical and/or logical links), e.g., component connections 205a-205m, sharing similar ingress and egress points. According to one embodiment, CTG 203 ingress and egress points correspond to optical nodes 107 and 109. For instance, optical node 109 may be an egress point of one or more component connections of CTG 203, while optical node 107 may be an ingress point of one or more component connections of CTG 203. Additionally, one or more other optical nodes of autonomous system 111 may embody "net hop" nodes on a path of CTG 203, i.e., on a path of a component connection (e.g., component connection 205b) of CTG 203. Furthermore, one or more CTGs established among nodes of autonomous system 111 may serve as "next hop" paths for traffic engineered flows, e.g., MPLS traffic flows, originating from an "upstream" source, e.g., node 115 or 117, which may also serve as terminating "downstream" targets, in alternative embodiments. These CTG(s) may be "next hop" paths for one or more inter-layer paths traversing a first autonomous system (e.g., autonomous system 119) and a second autonomous system (e.g., autonomous system 111).

From the perspective of CTG 203, each component connection 205a-205m acts as an independent transportation entity, and therefore, enables independent transportation path availabilities (e.g., physical and/or available bandwidths, administrative costs, latencies, etc.) for composite connection 201, i.e., for network traffic. That is, if network traffic is sequenced at an ingress point and transported over one or more component connections (e.g., component connections 205a-205m), then the network traffic may or may not arrive at an egress point in the same sequential order. Thus, when information is transported via composite connection 201 utilizing CTG 203, a layer processor (LP) at the ingress (e.g., LP 207) distinguishes component connections 205a-205m by processing each packet and distributing the packets over composite connection 201 via one or more of component connections 205a-205m. The ability of LP 207 to distinguish between component connections 205a-205m is dependent upon packet header format and information encoded therein, such as one or more labels for label-switched routing and/or one or more characteristics of a label-switched traffic flow that can be mapped to one or more attributes of component connections 205a-205m. Thus, LP 207 routes network traffic transparently from the entities attempting to transport and receive the traffic. In this manner, an autonomous system (e.g., autonomous system 111) gains transport scalability via composite connection 201 because individual component connections can be independently added, removed, and/or resolved by CTG 203, and since the transportation entities are only privy to the fact that composite connection 201, as a whole, is operational, the configuration of the transportation entities need not be affected.

Thus, composite connection 201 made available via CTG 203 can be applied in both connection-less packet-switched (CL-PS) optical networks, as well as in connection-oriented packet-switched (CO-PS) optical networks. In CL-PS environments, component connections 205a-205m can exist as point-to-point links between one or more autonomous systems of autonomous system 111, such as one or more autonomous systems of disparate telecommunication service providers. Optical nodes 107 and 109 utilize information encoded in packet headers provided by, for example, nodes 115 and 117 to distinguish between network traffic flows, e.g., between communications. That is, a processing entity (or control interface) of optical nodes 107 and 109 utilize this information to differentiate between component connections (e.g., component connections 205a-205m) and distribute network traffic over one or more CTGs (e.g., CTG 203). Thus, network traffic transported via CTG 203 is "seen" by nodes 115 and 117 as "belonging" to composite connection 201, as opposed to the particular component connection 205a-205m "actually" supporting the flow of network traffic.

In CO-PS environments, component connections 205a-205m of CTG 203 can be configured as point-to-point links, as above, or as point-to-point paths. Paths may be established over one or more optical links and, thereby, traverse one or more optical nodes. For composite connection 201 to support multiple communications from nodes 115 and 117 information may be encoded within individual packet headers to differentiate between communications, as well as to describe the communications, such as via a bandwidth, administrative cost, latency, etc., description. Accordingly, at composite connection 201 ingress, LP 207 can use this information to distribute packets over component connections 205a-205m, which enables multiple composite connections 201 to be configured over a CTG, such as CTG 203. Further, LP 207 may, when determining which component connection to utilize to support transport, use this information to perform traffic engineering and routing processes, e.g., to assign resource capacity, rank desirability of component connections 205a-205m, assess component connection latencies, etc., for individual communications. Namely, LP 207 may interwork traffic flows onto one or more component connections 205a-205m of CTG 203 utilizing this information, i.e., utilizing the characteristics of the traffic flows. In particular embodiments, this information may be acquired from a network administrator or network management system (not shown), as opposed to the packet headers. Thus, a composite connection 201 may be traffic engineered per component connections 205a-205m, as well as traffic engineered based on component connection attributes, e.g., bandwidth capability, administrative cost, latency, operational status, and the like, or node 105 attributes, e.g., allocated capacity, origination address, destination address, etc., which may be determined based on characteristics of the traffic flow.

Figure 3:
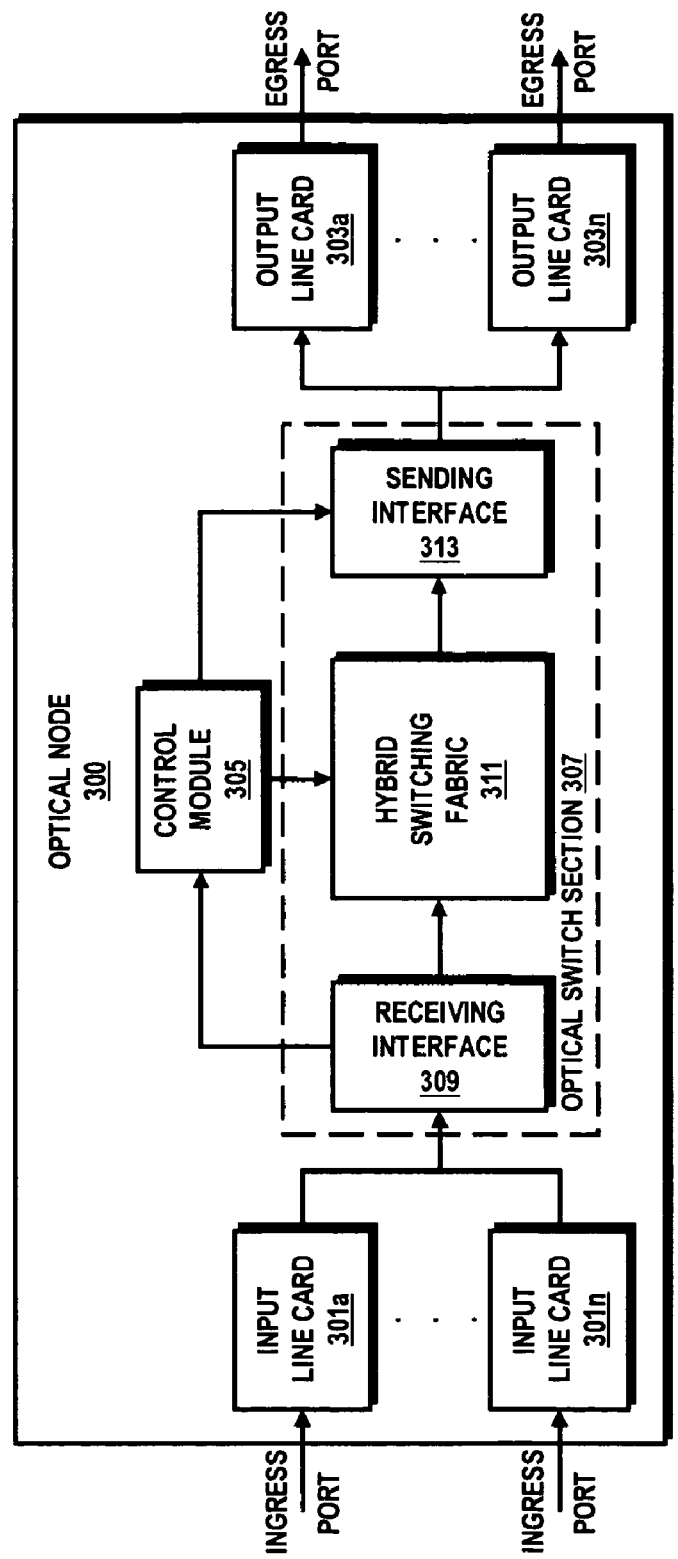
FIG. 3 is a diagram of an optical node configured to facilitate lower-layer path validation for higher-layer autonomous systems, according to an exemplary embodiment.

FIG. 3 is a diagram of an optical node configured to facilitate lower layer path validation for higher layer autonomous systems, according to an exemplary embodiment. For explanatory purposes, optical node 300 is described with respect to optical packet switching; however, may include functionality for optical burst switching, time division multiplexing (TDM), wavelength-division multiplexing (WDM), or any other suitable signal transfer scheme. As shown, optical node 300 includes input line cards 301a-301n, output line cards 303a-303n, control module (or interface) 305, and optical switch section 307; however, it is contemplated that optical node 300 may embody many forms. For example, optical node 300 may comprise computing hardware (such as described with respect to FIG. 10), as well as include one or more components configured to execute the processes described herein for validating lower layer paths for higher layer networks. Furthermore, it is contemplated that the components of optical node 300 may be combined, located in separate structures, or separate physical locations. In other words, a specific topology is not critical to embodiments of optical node 300 or system 100.

According to one embodiment, input line cards 301a-301n act as "n" input interfaces (ingress points) to optical node 300 from "n" transmitting sources (e.g., node 115), while output line cards 303a-303n act as "n" output interfaces (egress points) from optical node 300 to "n" destination nodes (e.g., optical node 109). When packets arrive at optical node 300, input line cards 301a-301n port packets to receiving interface 309 of optical switch section 307. Receiving interface 309 separates headers and payloads from individual packets. Header information is provided to control module 305 for routing purposes, while payloads are switched to destination output line cards 303a-303b via hybrid switching fabric 311 and sending interface 313. That is, hybrid switching fabric 311 routes payloads to appropriate pathways on sending interface 313, whereby updated headers are combined with switched payloads. The combination is output to destination nodes via output line cards 303a-303n.

In particular implementations, control module 305 is configured to provision one or more logical channels through hybrid switching fabric 311 based on system 100 topological information. These logical channels can be grouped into one or more CTGs. In turn, these CTGs may be interworked to host inter-layer paths from, for example, label-switched domain 103, so as to establish one or more lower-layer paths for a high layer autonomous system.

Figure 4:
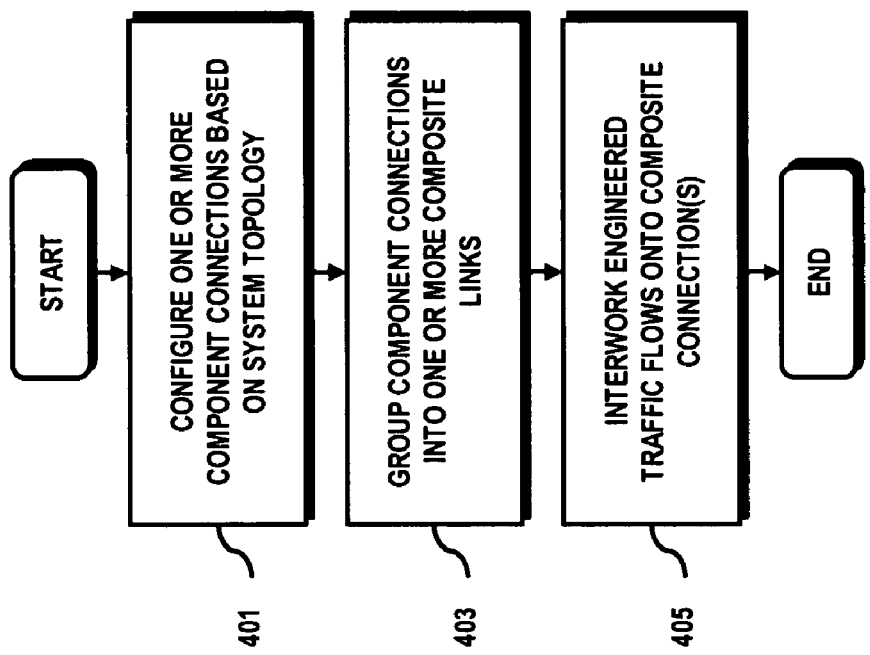
FIG. 4 is a flowchart of a process for establishing a composite transport group to host lower-layer paths for higher-layer autonomous systems, according to an exemplary embodiment.

FIG. 4 is a flowchart of a process for establishing a composite transport group to host lower-layer paths for high layer autonomous systems, such as label-switched domain 103, according to an exemplary embodiment. For illustrative purposes, process 400 is described with reference to FIGS. 1 and 2. It is noted that the process assumes the existence of one or more previously established (or constructed) physical connections extending between various optical nodes of autonomous system 111 to transport network traffic, such as user information or network control information. The steps of the process may be performed in any suitable order or combined in any suitable manner.

At step 401, one or more optical nodes (e.g., optical nodes 107 and 109) configure one or more component connections (i.e., logical channels) based on a topology of autonomous system 111, i.e., based on the establishment of one or more physical connections between one or more optical nodes of autonomous system 111. Individual component connections may be configured over an optical link or over a group of optical links (i.e., a path). In this manner, component connections are independent channels configured for transporting information, wherein each component connection is individually characterized by its own transport availability, i.e., administrative cost, available bandwidth, consumed bandwidth, existence, latency, physical bandwidth, operational status, priority, and the like. Thus, in step 403, various component connections may be grouped into one or more CTGs, such that any given CTG (e.g., CTG 203) includes several parallel component connections (e.g., component connections 205a-205m) establishing transport routes from a desired point "A," e.g., optical node 107, to a desired point "B," e.g., optical node 109. For example, CTG domain 101 may be characterized by one or more CTG paths 105, whether physical or logical, for facilitating lower layer paths for higher layer autonomous systems, such as autonomous system 119. The attributes of a composite connection (or CTG), i.e., the attributes of the component connections forming the CTG, may be stored to a memory (not shown) of, for example, optical nodes 107 and 109 and/or any other suitably accessible repository (not shown) of (or available to) system 100. According to one embodiment, these attributes may be stored to one or more tables that provide network traffic visibility so as to enable optical nodes 107 and 109 the ability to maximize and efficiently allocate available bandwidth among various information transporting nodes, e.g., nodes 115 and 117, based on, for instance, mapping (or translation) between characteristics (e.g., administrative costs, latencies, rankings, etc.) of a traffic flow associated with a higher layer autonomous system, e.g., autonomous system 119 of label-switched domain 103, and the attributes of the component connections. According to particular embodiments, the attributes maybe determined based on the characteristics of the traffic flow. In essence, mapping between the characteristics of the traffic flow and the attributes associated with a CTG (e.g., CTG 203) enables traffic flows to be interworked onto the CTG. Exemplary control mechanisms for triggering and controlling setup and interworking of traffic engineered flows between CTG domains and label-switched domains are explained in more detail in co-pending U.S. patent application Ser. No. 12/112,341, filed Apr. 30, 2008, entitled "METHOD AND SYSTEM FOR ANNOUNCING TRAFFIC ENGINEERING PARAMETERS OF COMPOSITE TRANSPORT GROUPS," and co-pending U.S. patent application Ser. No. 12/122,035, filed May 16, 2008, entitled "METHOD AND SYSTEM FOR PROVIDING TRAFFIC ENGINEERING INTERWORKING," the entireties of which are incorporated, herein, by reference.

Accordingly, once one or more composite connections are established, the composite connections may be announced to higher-layer autonomous systems (e.g., autonomous system 119) so that lower-layer paths may be provisioned and validated over autonomous system 111 in support of higher-layer autonomous systems, such as autonomous system 119 of label-switched domain 103. In this manner, inter-layer paths between autonomous systems 119 and 111 may be interworking onto the composite connection(s), per step 405. That is, a label-switched traffic flow, such as packetized optical signals, may be transported over one or more component connections (e.g., component connections 205a-205m), which are defined by one or more optical links of autonomous system 111, based on determining one or more attributes associated with the component connections based on one or more characteristics of the traffic flow, mapping (or translating) the traffic flow to one or more of the component connections based on the one or more attributes, and validating (or evaluating) the one or more characteristics in relation to alternative paths. Referring momentarily to FIG. 3, control module 305 establishes one or more CTGs (e.g., such as CTG 105 of CTG domain 101) for facilitating lower-layer path validation for higher-layer autonomous systems. As such, control module 305 is further configured to interwork traffic flows onto one or more CTGs but, more specifically, to interwork traffic flows on to one or more component connections that are bundled to form the CTGs, wherein the traffic flows are interworked between disparate layers of disparate autonomous systems.

Figure 5:
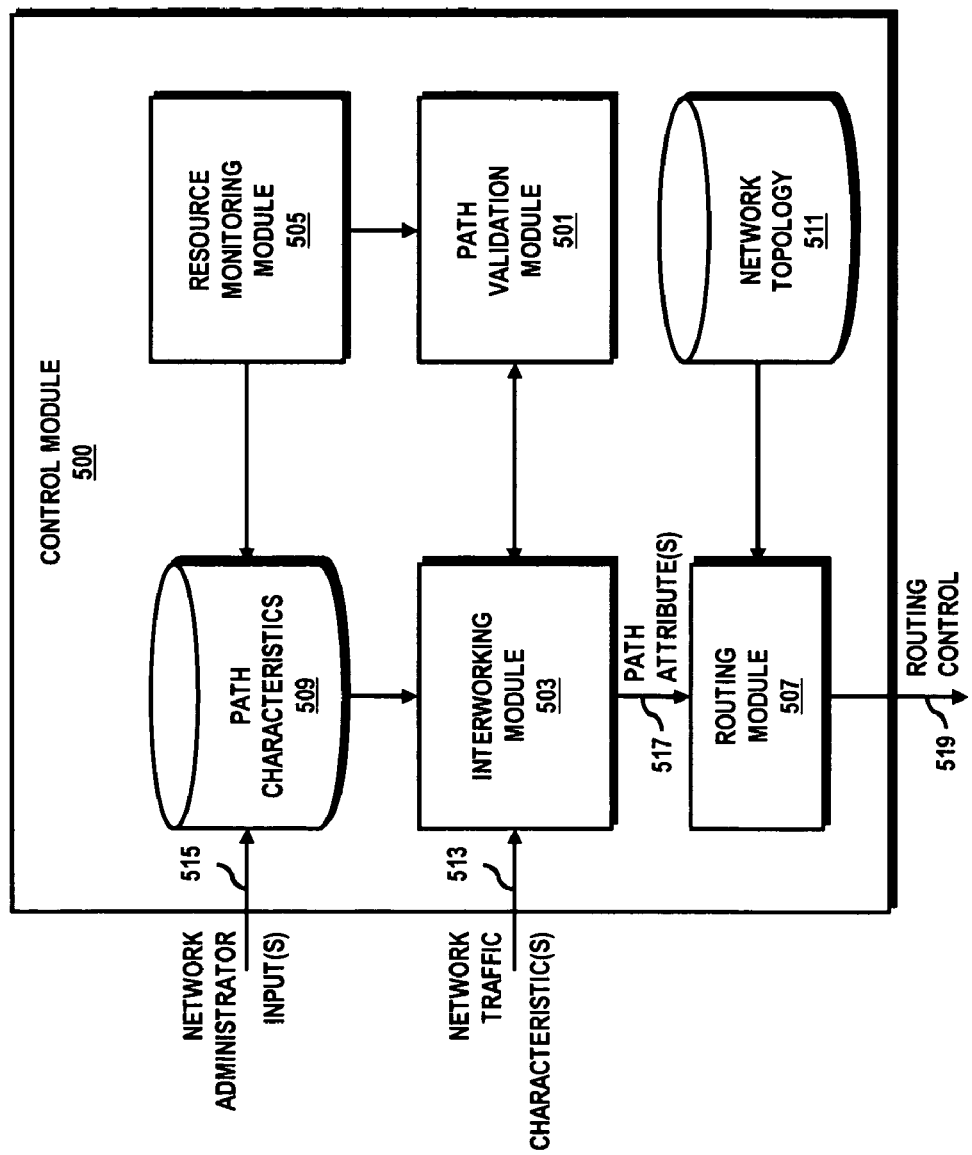
FIG. 5 is a diagram of a control module configured to validate lower-layer paths for higher-layer autonomous systems, according to an exemplary embodiment.

FIG. 5 is a diagram of a control module configured to validate lower-layer paths for higher-layer autonomous systems, according to an exemplary embodiment. As shown, control module 500 includes path validation module 501, interworking module 503, resource monitoring module 505, and routing module 507, as well as path characteristics repository 509 and network topology repository 511. It is contemplated; however, that control module 500 may embody many forms. For example, control module 500 may comprise computing hardware (such as described with respect to FIG. 10), as well as include one or more components configured to execute the processes described herein. In one embodiment, control module 500 may be implemented by optical nodes of autonomous system 111 (e.g., optical nodes 107 and 109) and/or nodes of autonomous system 119 (e.g., nodes 115 and 117). Thus, it is contemplated that the components of control module 500 may be combined, located in separate structures, or separate physical locations.

In exemplary embodiments, interworking module 503 is configured to reserve inter-layer and/or intra-layer paths of system 100 traversing one or more of autonomous systems 111 and 119 and/or CTG domain 101 and label switched domain 103. An exemplary process for reserving paths is explained in more detail with FIG. 6. Interworking module 503 may also be configured to interwork flows of network traffic between disparate autonomous systems (e.g., autonomous systems 111 and 119), as well as between differing layers of the packet-switched optical infrastructure of system 100. As such, interworking module 503 may operate under, one or more of the control mechanisms for triggering and controlling setup and interworking of traffic engineered flows between CTG domains and label-switched domains described in co-pending U.S. patent application Ser. No. 12/122,035. For instance, interworking module 503 may determine one or more attributes associated with a CTG based on one or more characteristics of a traffic flow associated with a label-switched domain, such as label-switched domain 103. Network traffic characteristic(s) 513 may be received from one or more "upstream" nodes, such as node 115. Interworking module 503 may also utilize one or more path characteristics (e.g., component connection characteristics) acquired from, for example, path characteristics repository 509, to determine the attributes for interworking traffic flows between CTG domain 101 and label-switched domain 103, as well as between autonomous system 111 and autonomous system 119. According to other embodiments, path characteristics may be acquired from any other suitable memory or repository of control module 500, optical node 300, and/or system 100. As shown, path characteristics, such as physical bandwidth, available bandwidth, provisioned bandwidth, path latency, path ranking, etc., stored to path characteristics repository 509 may be acquired from one or more inputs 515 of a network administrator or acquired by monitoring network traffic provisioned onto one or more reserved paths, e.g., reserved paths corresponding to one or more component connections. Resource monitoring module 505 can be utilized to monitor and store path characteristics to path characteristics repository 509. In particular implementations, resource monitoring module 505 is particularly configured to monitor and measure path latency information associated with reserved, lower-layer paths traversing autonomous system 111. Accordingly, interworking module 503 includes logic for determining path attributes 517 based on characteristics of a traffic flow associated with label-switched domain 103 and/or autonomous system 119.

According to exemplary embodiments, path validation module 501 may be configured to validate paths based on, for instance, comparing one or more administrative costs (e.g., path cost information, path ranking information, and path latency information) of various (or alternative) paths for selectively accepting path reservations. Exemplary processes for path validation are explained in more detail in association with FIGS. 7-9.

Further, traffic flows may be mapped to one or more paths (e.g., lower-layer paths) by routing module 507 utilizing path attributes 517 and/or topological information characterizing one or more autonomous systems of system 100, such as autonomous systems 111 and 119. Network topology repository 511 may be populated utilizing one or more of the aforementioned signaling and/or routing protocols or may be pre-configured by a network administrator. In this manner, routing module 507 may be configured to generate routing control signals 519 for controlling optical switch section 307 of optical node 300. In instances when control module 500 is implemented by a node of autonomous system 119, routing control signals 519 may control switching sections of, for instance, a label-switched router. In any event, routing module 507 enables network traffic flows to be provisioned onto and between one or more inter-layer or intra-layer paths of autonomous systems 111 and 119.

Figure 6:
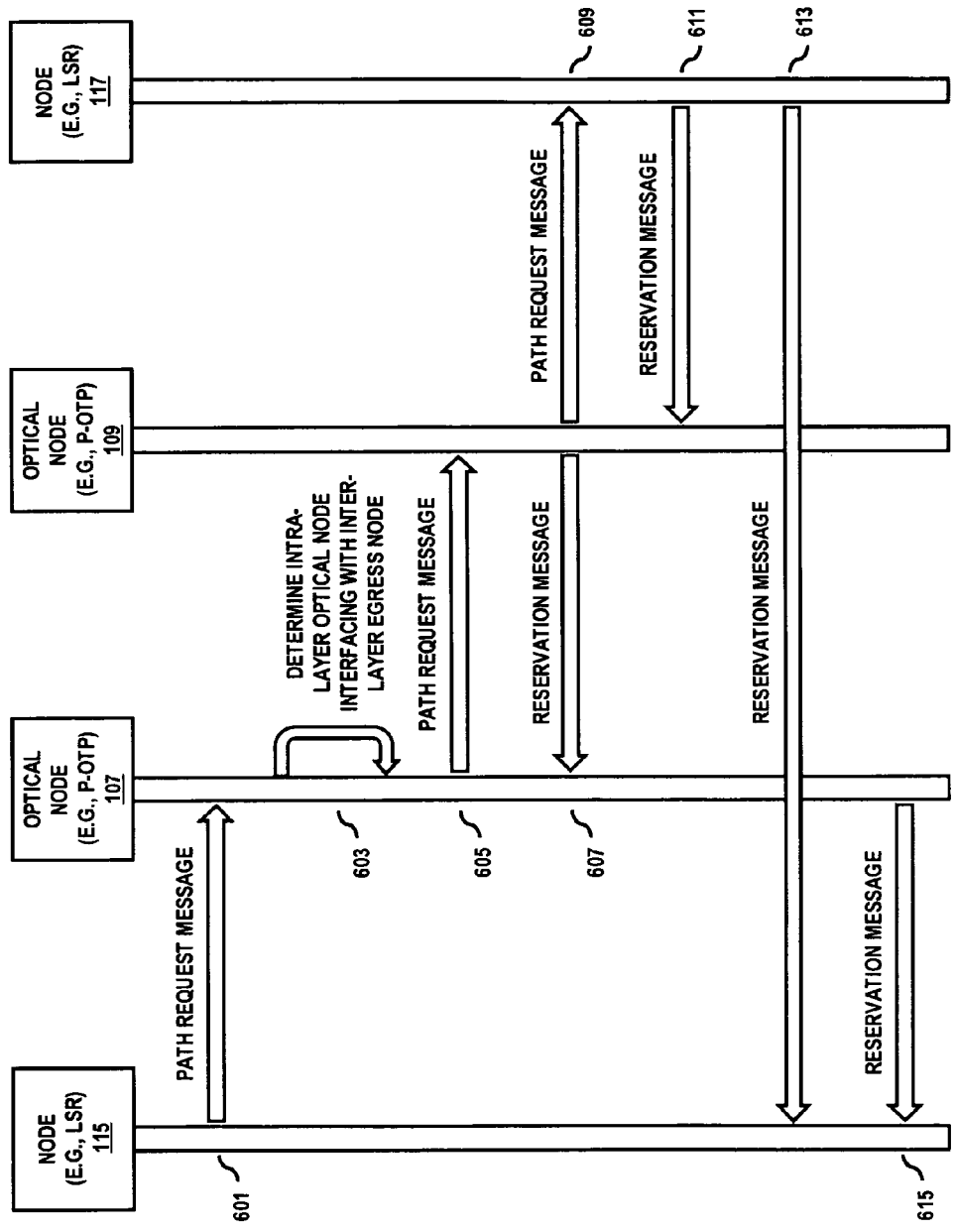
FIG. 6 is a sequence diagram for reserving a lower-layer path for a higher-layer autonomous system, according to an exemplary embodiment.

FIG. 6 is a sequence diagram for reserving a lower layer path for a higher layer autonomous system, according to an exemplary embodiment. For illustrative purposes, the sequence is described with reference to FIGS. 1 and 5. It is noted that the sequence assumes the existence of one or more previously established (or constructed) physical connections extending between domains 101 and 103, as well as between autonomous systems 111 and 119, such as NNIs 121 and 123. As previously mentioned, NNIs 121 and 123 enable inter-layer TE across disparate autonomous systems of disparate domains of the packet-switched optical infrastructure of system 100. It is noted that the steps of the sequence may be performed in any suitable order or combined in any suitable manner.

At step 601, higher-layer node 115 transmits a path request message (e.g., an RSVP-TE object, signal, etc.) to lower-layer optical node 107 via NNI 121 in order to support higher-layer autonomous system 119. That is, node 115 requests a lower-layer path over autonomous system 111 that is intended to logically facilitate one or more higher-layer traffic flows between node 115 (e.g., an ingress node) and node 117 (e.g., an egress node) at, for example, a certain requested capacity. Utilizing topology information stored to network topology repository 511, control module 500 of optical node 107 determines, per step 603, that lower-layer optical node 109 interfaces with higher-layer node 117 via NNI 123. As such, optical node 107 transmits, in step 605, a path request message to optical node 109 to reserve an intra-layer path between optical node 107 and optical node 109, as well as an inter-layer path between lower-layer optical node 109 and higher-layer node 117 at the certain requested capacity.

According to certain exemplary embodiments, optical node 109 will transmit a reservation message back to optical node 107 reserving, for example, one or more component connections of one or more composite connections associated with autonomous system 111, such as one or more component connections of CTG path(s) 105, per step 607. Lower-layer optical node 109 may also transmit, at step 609, a path request message to higher-layer node 117 via NNI 123 for one or more inter-layer paths between lower-layer optical node 109 and higher-layer node 117 at the certain requested capacity. In step 611, higher-layer node 117 responds to lower-layer optical node 109 with a reservation message reserving capacity over NNI 123, i.e., reserving one or more inter-layer paths between lower-layer optical node 109 and higher-layer node 117 on NNI 123. Node 117 also transmits, per step 613, a reservation response message to node 115 reserving one or more MPLS paths 113, at the certain requested capacity, over autonomous system 113. Namely, node 117 provides node 115 with one or more intra-layer MPLS paths 113 extending between node 115 and node 117 at the certain requested capacity. At step 615, lower-layer optical node 107 transmits a reservation response to higher layer node 115 reserving one or more inter-layer paths on NNI 121, i.e., one or more inter-layer paths extending between lower-layer optical node 107 of autonomous system 111 in CTG domain 101 and higher layer node 115 of autonomous system 119 in label-switched domain 103, at the certain requested capacity.

Accordingly, once the various inter-layer and intra-layer paths are reserved, i.e., once node 115 receives reservation responses from optical node 107 and node 117, node 115 can initiate one or more path validation schemes. In exemplary embodiments, path validation may be achieved by, for example, a higher layer ingress node (e.g., node 115) comparing administrative cost metrics (e.g., path cost information, path ranking information, and/or path latency information) associated with the various alternative paths reserved in the sequence of FIG. 6. It is noted that the administrative cost metrics of the various alternative paths may be translated, mapped, or otherwise normalized in order to permit the higher layer node to systematically compare the administrative costs of the aforementioned paths. Namely, because these paths extend between disparate domains and traverse multiple layers of the packet-switched optical infrastructure of system 100, the administrative costs are, for practical purposes, irreconcilable.

Figure 7:
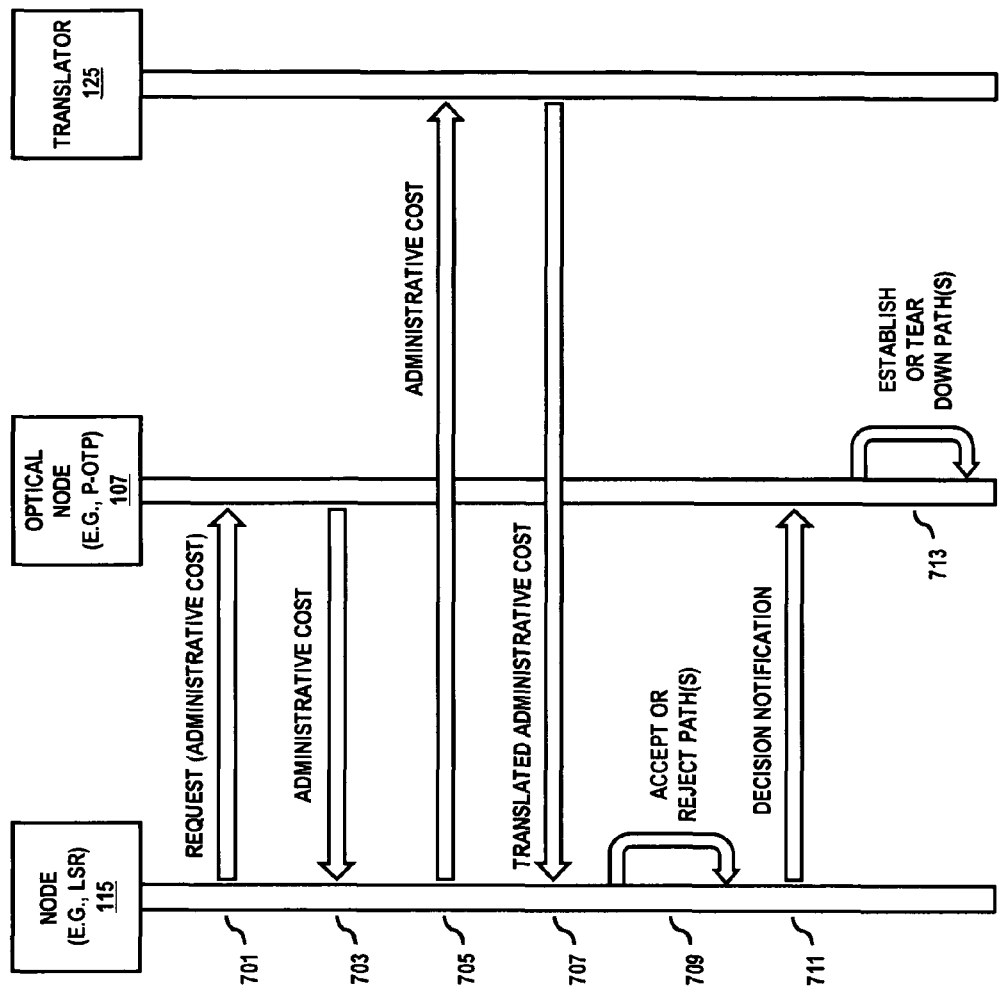
FIGS. 7-9 are sequence diagrams for validating lower-layer paths for higher-layer autonomous systems, according to exemplary embodiments.
Figure 8:
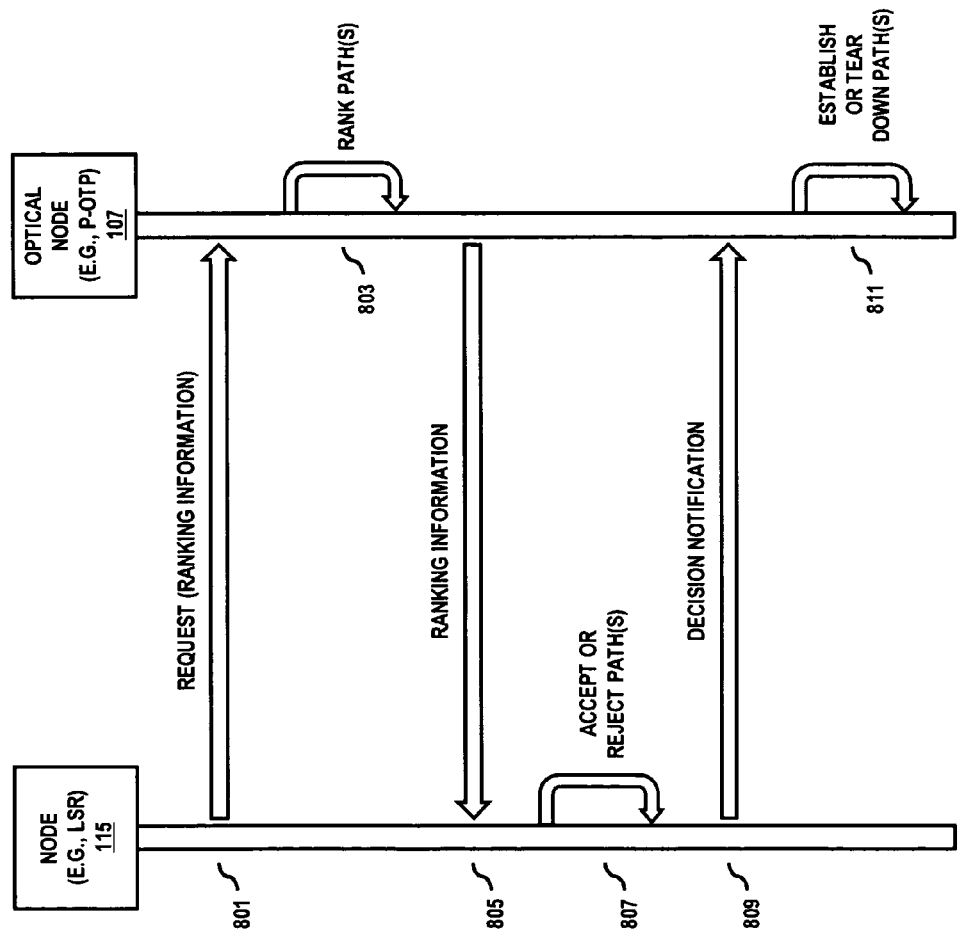
Figure 9:
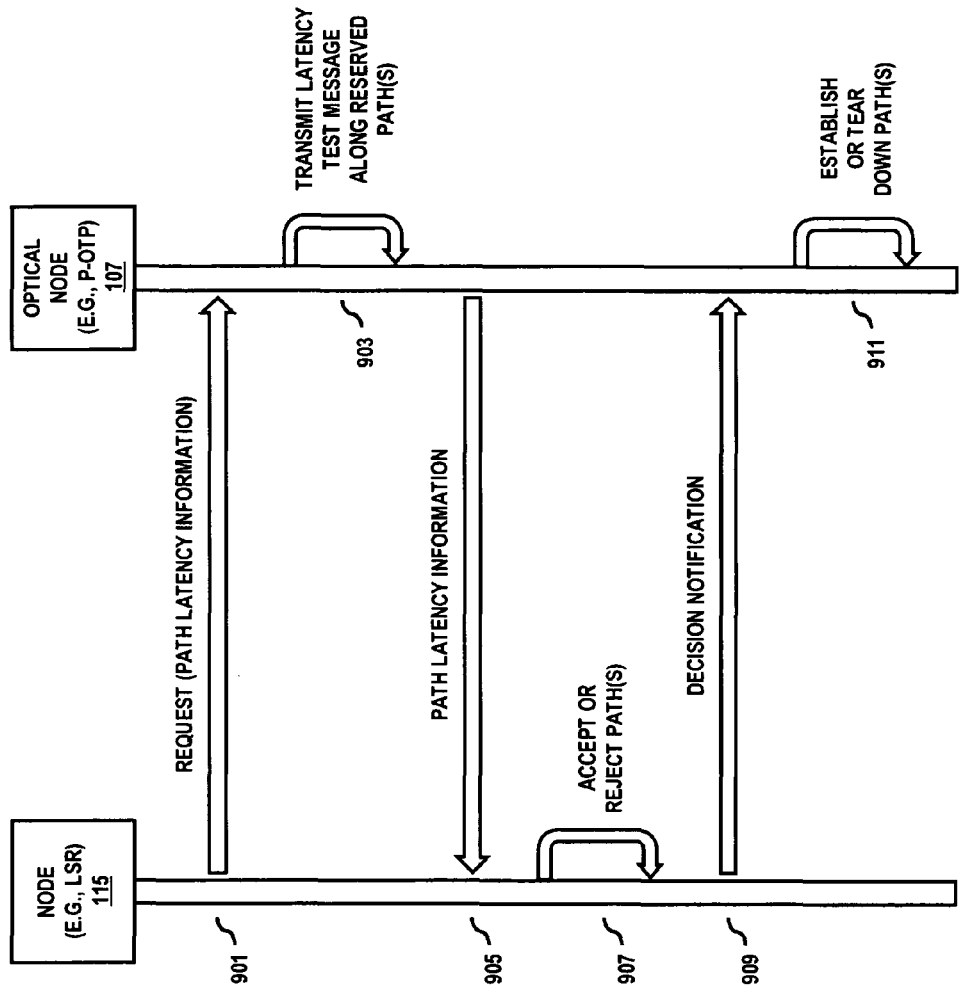

FIGS. 7-9 are sequence diagrams for validating lower layer paths for higher layer autonomous systems, according to exemplary embodiments. For illustrative purposes, these sequences are described with reference to FIG. 1. It is also noted that the steps of the sequences may be performed in any suitable order or combined in any suitable manner.

FIG. 7 is a sequence diagram for path computation and comparison for instances when autonomous systems 111 and 119 provide for administrative cost metrics that are similar or are, at least, conducive to translation, conversion, normalization, etc., that would enable systematic comparisons to be achieved. Thus, at step 701, higher-layer node 115 of autonomous system 119 transmits a request to lower-layer optical node 107 of autonomous system 111 for path cost information relating one or more of the paths reserved during the sequence of FIG. 6, i.e., one or more paths traversing a first autonomous system (e.g., autonomous system 119) and a second autonomous system (e.g., autonomous system 111) of the packet-switched optical infrastructure of system 100. In step 703, lower layer optical node 107 transmits the path cost information to higher layer node 115 associated with reservation of capacity for the one or more paths. That is, control module 500 of optical node 107 may retrieve such path cost information from path characteristics repository 509 and transmit the path cost information to higher-layer node 115 via NNI 121. Per step 705, node 115 may, when necessary, transmit the path cost information to translator 125 that, in certain embodiments, may be a path computation element (PCE) as defined by previously incorporated RFC 4655. As such, translator 125 may utilize information stored to one or more management information base (MIB) tables (not shown) providing translator with various networking information, such as one or more communication protocols, routing and signaling extensions, metric standards, PCE monitoring information, and the like, corresponding to path cost information associated with the aforementioned paths, but quantified as, for instance, one or more label-switched domain parameters. Translator 125 transmits, at step 707, the translated path cost information to node 115. In step 709, node 115 evaluates the translated path cost information with administrative cost information associated with one or more alternate paths (e.g., intra-layer MPLS paths 113 of autonomous system 119) reserved between nodes 115 and 117. That is, node 115 may systematically compare the various path cost information to determine one or more optimal paths. In certain instances, node 115 or translator 125 may augment (or otherwise add) one or more pre-defined path costs to the path cost information associated with the path(s) reported by lower layer optical node 107, so as to account for the path costs corresponding to NNIs 121 and 123. Accordingly, higher-layer node 115 notifies lower-layer node 107 which, if any, of the inter-layer paths extending between autonomous systems 111 and 119 and, thereby, traversing autonomous system 111, are accepted for hosting one or more engineered traffic flows, per step 711. Namely, higher-layer node 115 informs lower-layer optical node 107 which lower-layer reserved paths will be utilized in support of higher-layer autonomous system 119, i.e., in support of engineered traffic flows between nodes 115 and 117. Lower-layer optical node 107 provisions accepted lower-layer reserved paths to, for example, one or more of CTG paths 105 and, thereby, tears down lower-layer reserved paths rejected by higher-layer node 115, at step 713.

In those instances when IGP administrative costs cannot be shared (or are not conducive to translation, conversion, normalization, etc., by translator 125), node 115 may seek a "best case" scenario. That is, node 115 may utilize administrative cost information in the form of one or more relative path rankings. FIG. 8 is an exemplary sequence diagram for validating lower-layer paths in support of higher-layer autonomous systems based on relative path ranking information. At step 801, higher-layer node 115 of autonomous system 119 transmits a request to lower-layer optical node 107 of autonomous system 111 for relative path ranking information ordering the reserved, lower-layer path(s), such as in a first, second, third, etc., scheme. It is contemplated that any other suitable ranking scheme may be utilized for commutating the relative optimization of the reserved, lower-layer paths. As such, optical node 107, via control module 115, ranks the reserved, lower-layer paths, per step 803. This path ranking information is transmitted to higher-layer node 115 by lower-layer node 107, in step 805. Accordingly, node 115 evaluates, at step 807, the path ranking information to determine whether one or more of the lower-layer paths are to be utilized in support of higher-layer autonomous system 119. As such, higher-layer node 115 notifies lower-layer node 107 which, if any, of the inter-layer paths extending between autonomous systems 111 and 119 and, thereby, traversing lower-layer autonomous system 111, are accepted for hosting one or more engineered traffic flows, per step 809. Namely, higher-layer node 115 informs lower-layer optical node 107 which lower-layer reserved paths will be utilized in support of higher-layer autonomous system 119, i.e., in support of engineered traffic flows between nodes 115 and 117. Lower-layer optical node 107 provisions accepted lower-layer reserved paths to, for example, one or more of CTG paths 105 and, thereby, tears down lower-layer reserved paths rejected by higher-layer node 115, at step 811.

According to other exemplary embodiments, lower-layer paths may be validated based on testing reserved paths for latency and, thereby, comparing corresponding path latency information between the various reserved paths. It is noted that this approach requires one or more of the nodes of autonomous systems 111 and/or 119 to be capable of generating automatic latency testing messages.

FIG. 9 is an exemplary sequence diagram for validating lower-layer paths in support of higher-layer autonomous systems based on path latency information. At step 901, higher-layer node 115 of autonomous system 119 transmits a request to lower-layer optical node 107 of autonomous system 111 for path latency information associated with one or more of the paths reserved during the sequence of FIG. 6, i.e., one or more paths traversing a first autonomous system (e.g., autonomous system 119) and a second autonomous system (e.g., autonomous system 111) of the packet-switched optical infrastructure of system 100. In step 903, optical node 107 transmits one or more latency test messages (e.g., one or more predefined data streams) along reserved, lower-layer paths, such that resource monitoring module 505 may monitor these reserved, lower-layer paths and, thereby, measure one or more performance parameters (e.g., bit error rate, jitter, latency, packet loss, etc.) associated with the reserved, lower-layer paths. It is contemplated that certain ones of these performance parameters (e.g., path latency) may be measured "one-way" (e.g., from a transmitting entity to a receiving entity) or "round-trip" (e.g., from a transmitting entity to a receiving entity and from the original receiving entity back to the original transmitting entity). For example, pinging and echo response messages may be exchanged between respective ends of the reserved, lower-layer paths. In any event, lower-layer optical node 107 transmits, in step 905, the path latency (and/or one or more of the other performance parameters) to higher-layer node 115. At step 907, node 115 evaluates, for instance, the path latency information associated with the reserved, lower-layer paths in relation to one or more alternate paths (e.g., intra-layer MPLS paths 113 of autonomous system 119) reserved between nodes 115 and 117. That is, node 115 may systematically compare the path latency information to determine one or more optimal paths. In certain instances, node 115 may augment (or otherwise add) one or more pre-defined path latencies to the path latency information associated with the path(s) reported by lower-layer optical node 107, so as to account for the path latencies corresponding to NNIs 121 and 123. Accordingly, higher-layer node 115 notifies lower-layer optical node 107 which, if any, of the inter-layer paths extending between autonomous systems 111 and 119 and, thereby, traversing autonomous system 111, are accepted for hosting one or more engineered traffic flows, per step 909. Namely, higher-layer node 115 informs lower-layer optical node 107 which lower-layer reserved paths will be utilized in support of higher-layer autonomous system 119, i.e., in support of engineered traffic flows between nodes 115 and 117. Lower-layer optical node 107 provisions accepted lower-layer reserved paths to, for example, one or more of CTG paths 105 and, thereby, tears down lower-layer reserved paths rejected by higher-layer node 115, at step 911.

The processes described herein for providing lower-layer path validation for higher-layer autonomous systems may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
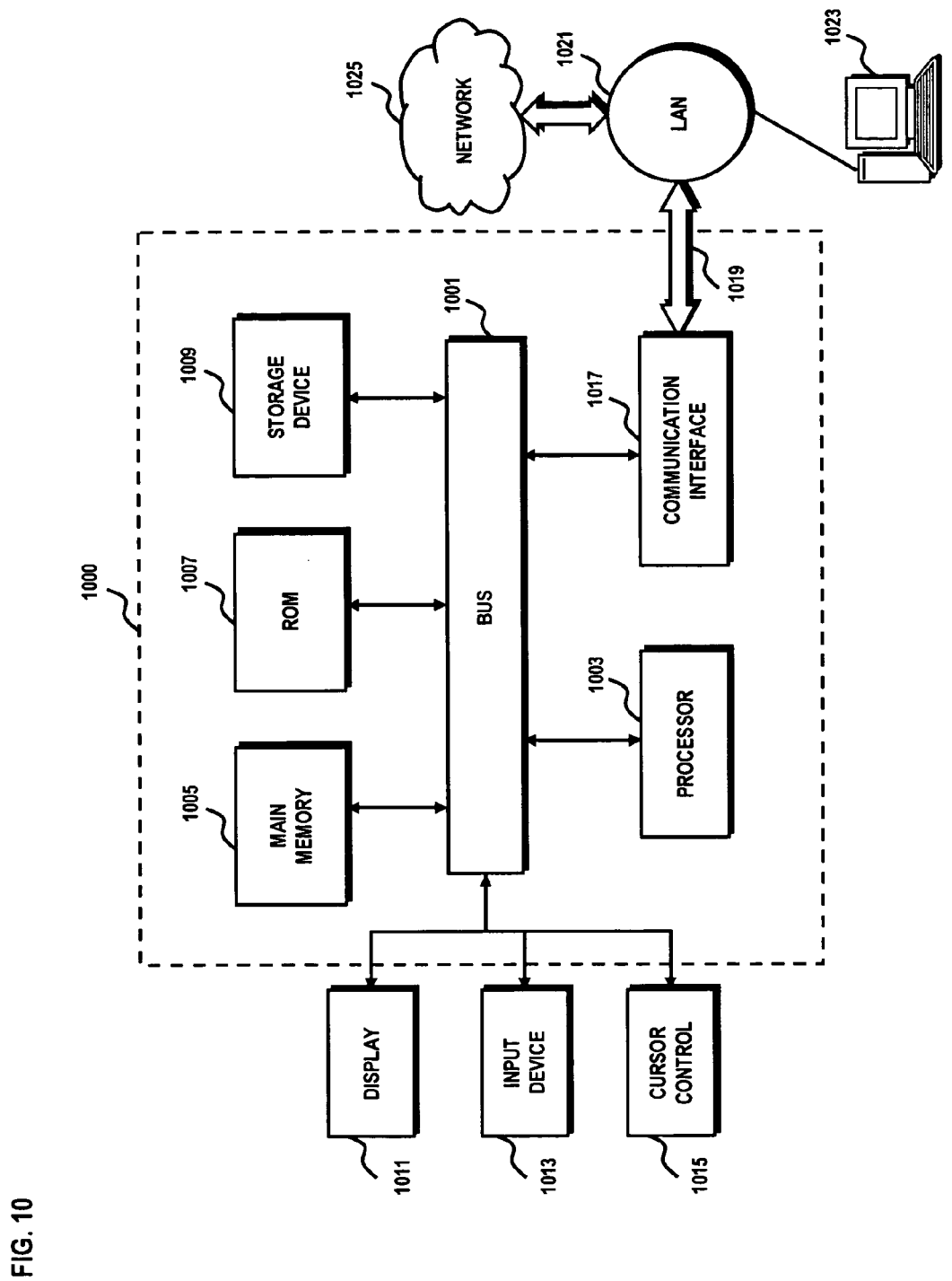
FIG. 10 is a diagram of a computer system that can be used to implement various exemplary embodiments.

FIG. 10 illustrates computing hardware (e.g., computer system) 1000 upon which an embodiment according to the invention can be implemented. The computer system 1000 includes a bus 1001 or other communication mechanism for communicating information and a processor 1003 coupled to the bus 1001 for processing information. The computer system 1000 also includes main memory 1005, such as a random access memory (RAM) or other dynamic storage device, coupled to the bus 1001 for storing information and instructions to be executed by the processor 1003. Main memory 1005 can also be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a cathode ray tube (CRT), liquid crystal display, active matrix display, or plasma display, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011.

According to an embodiment of the invention, the processes described herein are performed by the computer system 1000, in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement the embodiment of the invention. Thus, embodiments of the invention are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, communication interface 1017 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 (e.g. a wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an embodiment of the invention through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to non-volatile media, volatile media, and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
generating a request for a plurality of networking parameters relating to a path traversing a first autonomous system including a composite transport group domain and a second autonomous system including a label-switched domain, wherein the first autonomous system and the second autonomous system are layers of a connection-oriented transport environment, and the composite transport group comprises a logical bundling of one or more of physical and logical links;
receiving the plurality of networking parameters associated with a reservation of capacity for the path;
evaluating the plurality of networking parameters to optimize resource utilization across all autonomous system layers of the connection-oriented transport environment; and
selectively accepting the reservation based on the evaluation,
wherein the second autonomous system is a higher layer of the connection-oriented transport environment than the first autonomous and generates the request, and
wherein the plurality of networking parameters comprises path cost information and path latency information, and one or more of administrative cost information, bandwidth information, and a ranking of reserved paths.

2. A method according to claim 1, the method further comprising:
translating the path cost information to cost metrics, wherein each of the autonomous systems utilizes different cost metrics; and
comparing the translated cost metrics with cost metrics of an alternate path within the first autonomous system and the second autonomous system.

3. A method according to claim 1, wherein generation of the request is performed at a router of the first autonomous system.

4. An apparatus comprising:
a processor configured to generate a request for a plurality of networking parameters relating to a path traversing a first autonomous system including a composite transport group domain and a second autonomous system including a label-switched domain, wherein the first autonomous system and the second autonomous system are layers of a connection-oriented transport environment, and the composite transport group comprises a logical bundling of one or more of physical and logical links; and
a communication interface configured to receive the plurality of networking parameters associated with a reservation of capacity for the path,
wherein the processor is further configured to evaluate the plurality of networking parameters to optimize resource utilization across all autonomous system layers of the connection-oriented transport environment, and to selectively accept the reservation based on the evaluation,
wherein the second autonomous system is a higher layer of the connection-oriented transport environment than the first autonomous and generates the request, and
wherein the plurality of networking parameters comprises path cost information and path latency information, and one or more of administrative cost information, bandwidth information, and a ranking of reserved paths.

5. An apparatus according to claim 4, wherein the processor is further configured to:
translate the path cost information to cost metrics, wherein each of the autonomous systems utilizes different cost metrics; and
compare the translated cost metrics with cost metrics of an alternate path within the first autonomous system and the second autonomous system.

6. An apparatus according to claim 1, wherein the apparatus is a routing node of the first autonomous system.

7. A method comprising:
receiving, at a first routing node, a request for a plurality of networking parameters relating to a path traversing a first autonomous system including a composite group domain and a second autonomous system including a label-switched domain, wherein the first autonomous system and the second autonomous system are layers of a connection-oriented transport environment, the composite transport group comprises a logical bundling of one or more of physical and logical links, and the second autonomous system is a higher layer of the connection-oriented transport environment than the first autonomous and generates the request,;
transmitting, to a second routing node, the plurality of networking parameters associated with a reservation of capacity for the path;
receiving a response decision for establishing the path, wherein the response decision is based on an evaluation of the plurality of networking parameters to optimize resource utilization across all autonomous system layers of the connection-oriented transport environment; and
selectively establishing the path based on the response decision,
wherein the plurality of networking parameters comprises path cost information and path latency information, and one or more of administrative cost information, bandwidth information, and a ranking of reserved paths.

8. A method according to claim 7,
wherein the path cost information is translated to cost metrics, wherein each of the autonomous systems utilizes different cost metrics, and
wherein the evaluation of the plurality of networking parameters includes a comparison of the translated cost metrics with cost metrics of an alternate path within the first autonomous system and the second autonomous system.

9. An apparatus comprising:
a communication interface configured to,
receive a request for a plurality of networking parameters relating to a path traversing a first autonomous system including a composite transport group domain and a second autonomous system including a label-switched domain, wherein the first autonomous system and the second autonomous system are layers of a connection-oriented transport environment, the composite transport group is logical bundling of one or more of physical and logical links, and the second autonomous system is a higher layer of the connection-oriented transport environment than the first autonomous and generates the request, and transmit, to a routing node, the plurality of networking parameters associated with a reservation of capacity for the path; and a processor configured to, selectively establish the path based on a response decision for establishing the path, wherein the response decision is based on an evaluation of the plurality of networking parameters to optimize resource utilization across all autonomous system layers of the connection-oriented transport environment, and the plurality of networking parameters comprises path cost information and path latency information, and one or more of administrative cost information, bandwidth information, and a ranking of reserved paths.

10. An apparatus according to claim 9, wherein the path cost information is translated to cost metrics, wherein each of the autonomous systems utilizes different cost metrics, and wherein the evaluation of the plurality of networking parameters includes a comparison of the translated cost metrics with cost metrics of an alternate path within the first autonomous system and the second autonomous system.

* * * * *